Patented Nov. 29, 1932

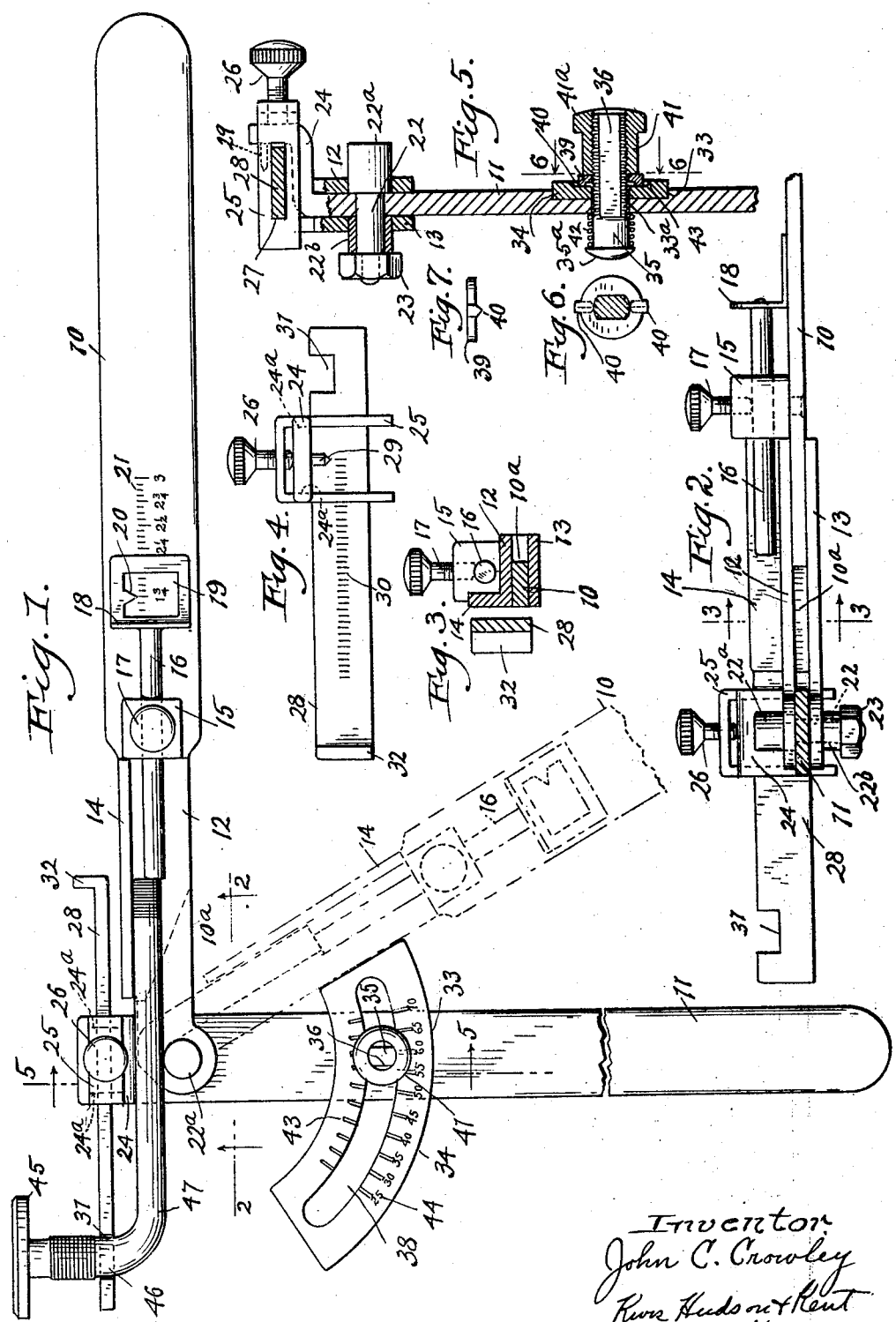

1,889,239

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

VALVE STEM BENDING TOOL

Application filed January 12, 1931. Serial No. 508,104.

This invention relates to a bending tool which has particular utility in connection with the bending of valve stems that are used on the pneumatic tires of motor vehicles.

An object of the invention is to provide a bending tool which is simple in construction, which may be easily and accurately adjusted for different conditions of operation, and which may be easily and efficiently operated.

A more specific object is to provide a tool for bending the valve stems of pneumatic tires such that the bend formed in the stem will be accurately located with respect to the head and to the outer end of the valve stem and will also be formed accurately to the desired angularity.

Additional objects and advantages present in the invention will become apparent hereinafter during the detailed description of an embodiment thereof illustrated in the accompanying drawing, wherein:

Figure 1 is a top plan view of the tool with a valve stem to be bent positioned therein, the relative position of the tool parts and the valve stem after the bending operation being indicated in dotted lines;

Fig. 2 is a fragmentary sectional view taken substantally on line 2—2 of Fig. 1, looking in the direction of the arrows, the valve stem being omitted in this view;

Fig. 3 is a sectional view taken on line 3—3 of Fig. 2 looking in the direction of the arrows;

Fig. 4 is a detail elevational view of a part of the tool;

Fig. 5 is a fragmentary sectional view taken substantially on line 5—5 of Fig. 1 looking in the direction of the arrows;

Fig. 6 is a sectional view taken on line 6—6 of Fig. 5 looking in the direction of the arrows; and Fig. 7 is a detail elevational view.

The tool of the present invention is susceptible of use where it is desired to accurately form an angular bend in a normally straight member and to definitely and precisely locate such bend with respect to the opposite ends of the member. However, since the tool has particular utility in connection with the bending of valve stems of pneumatic tires, it will be described herein in that connection.

As well understood, the usual valve stem of pneumatic tires for motor vehicles includes an elongated tubular stem portion on one end of which is a head which is arranged within the inner tube of the tire. The tubular portion is usually exteriorly threaded adjacent the head so that a so-called "spreader plate" may be held by means of a nut or other member in clamping relationship with the head to clamp the tire tube between it and the head. The opposite end of the tubular portion of the stem is usually interiorly threaded to enable valve insides to be screwed into the stem.

Of course with the usual single wood, wire or disc wheels of motor vehicles of the passenger type and also with certain types of motor truck wheels, the valve stems of the pneumatic tires used on such wheels may be straight stems. On the other hand, certain disc and wire wheels used on motor vehicles as well as the dual wheels found on motor busses and trucks necessitate the use of bent valve stems so that the end of the stems containing the valve insides will be accessible for inflating the tire. Since there is a wide variety of design in these various types of wheels it has been necessary to provide valve stems having bends therein at different positions intermediate the ends of the stem and of different angularity. Unless a tire dealer carries a wide variety of stems in so far as the bend is concerned, it would frequently happen that he would not have the proper valve stem for a particular type of wheel.

The present invention contemplates the provision of means whereby a standard form or forms of valve stems may be furnished to dealers or other persons desiring the same and the stems bent as desired before they are mounted upon the tire. Thus valve stems of conventional construction may be quickly adapted for use upon all of the various types of wheels.

The tool disclosed in the present embodiment of the invention comprises two arms 10 and 11. The arm 10 has a pair of plates 12 and 13 secured by welding or other suitable means to the opposite sides of the arm adjacent an end thereof and extending outwardly beyond such end of the arm to provide spaced connecting portions each having an opening therethrough aligning with the opening in the opposite member. The end of the arm 10 between the plates 12 and 13 is disposed at an angle as indicated at 10ª in Figs. 1, 2 and 3 for a purpose later to be made apparent. The plate 12 is provided along a portion of one of its edges with an upturned flange 14 while the arm 10 on the same side that the plate 12 is secured has a post or plug 15 adjacent the inner end of the plate 12. This post or plug 15 may be suitably secured in any manner to the arm 10, such as by the rivet indicated in Fig. 2, and is provided with an opening extending through the plug longitudinally of the arm 10 and in which slidably fits a rod 16. This rod 16 may be clamped in various positions of adjustment in the plug 15 by means of a clamping or set screw 17 screwed into a threaded opening extending downwardly from the top of the plug and communicating with the opening through the plug. The end of the rod 16 remote from the plate 12 has fastened thereto an angle member 18, one arm of such member sliding along the surface of the arm 10 and being provided with a rectangular opening 19 on an edge of which is a pointer 20 arranged to cooperate with the indicia of a scale indicated at 21 on the arm 10. The purpose of the rod 16 and the reading indicated by the pointer and scale will be explained more in detail hereinafter.

The outwardly extending connecting portions of the plates 12 and 13 straddle the arm 11 adjacent an end thereof with the openings in such portions aligning with an opening through the arm 11, as clearly indicated in Fig. 5. A pivot bolt 22 extends through the openings in the plates 12 and 13 and the arm 11, this bolt having an enlarged head 22ª fitting within the opening in the plate 12 and supporting a bushing 22ᵇ fitting within the opening in the plate 13. The plates 12 and 13 together with the arm 11 and the pin or bolt 22 are held in assembled relationship by means of a nut 23 screwed on the pin or bolt 22 adjacent the bushing 22ᵇ whereby the arms 10 and 11 are pivotally connected together. The arm 11 beyond the point of its pivotal connection with the arm 10 is provided with an upward and outwardly turned portion 24 in the edges of which adjacent the outer end of such portion are aligned recesses 24ª which slidably receive the legs of a substantially U-shaped member 25, the base of such member being provided with a threaded opening through which extends a clamping or set-screw 26 arranged to bear upon the upper side of the outwardly extending portion of the arm 11. The legs of the U-shaped member 25 are each provided with aligned openings 27 through which extends a plate 28, the relationship between the opening 27 and the plate 28 being clearly indicated in Fig. 5. The plate 28 may be slid to various positions of adjustment in the openings 27 and clamped in such positions of adjustment by means of the clamping or set-screw 26 which when screwed down into engagement with the portion 24 of the arm 11 causes the U-shaped member 25 to move upwardly whereby the upper edge of the plate 28 is clamped against the under side of the portion 24. This under side of the portion 24 is provided with a pointer 29 cooperating with the indicia of a scale 30 arranged on the plate 28 for a purpose later to be explained. The plate 28 is further provided on one edge and adjacent an end of the plate with a reentrant slot 31 while the other end of the plate 28 has an outturned flange 32.

The arm 11 inwardly of its pivotal connection to the arm 10 has on its upper side a curved groove 33 the center of curvature of such groove being the point of pivotal connection between the arms 10 and 11. An arcuate plate 34 concentric with the recess 33 is arranged in said recess and may be moved to various positions of adjustment and clamped therein by a clamping means now to be described. In the arm 11 at the center of the recess is an opening 33a which receives the threaded portion of a stud 35, such portion of the stud being provided with diametrically disposed flats 36 which form a shoulder limiting the relative position of the stud and arm 11 as clearly shown in Fig. 5. This threaded portion of the stud 35 passes through an arcuate slot 38 in the plate 34, the slot 38 being concentric with the curved sides of the plate and with the recess 33. A washer 39 is arranged on the threaded portion of the stud 35 outwardly of the arcuate plate 34 and has diametrically located outwardly and downwardly extending points or projections 40. A clamping nut 41 having a knurled head 41a is screwed on the end of the threaded portion of the stud 35 while a spring 42 is arranged on the stud intermediate the head 35a thereof and the under side of the arm 11. The opposite edges of the slot 38 and the plate 34 are provided with aligned radially extending depressions or grooves 43 which receive the points or projections 40 on the washer 39 when the nut 41 is screwed down upon the stud 35. This engagement between the points or projections 40 on the washer 39 and the recesses or grooves 43 in the plate 34 clamps the plate in position upon the arm 11, such grooves or recesses 43 forming the graduations of a scale the indicia of which are indicated at 44. The purpose of the plate 34 may be briefly stated to be a limiting or stop member for the pivotal movement of the arms 10 and 11 which allows said arms to be moved toward each other to a predetermined angle, it being noted that the end of the plate 34 is arranged to engage with the arm 10, while the angle end 10a of the arm 10 enables the arms 10 and 11 to be moved closely together.

In Fig. 1 one form of valve stem is disclosed in position in the tool. Since practically all valve stems that are used with the types of wheels which require bent valve stems must have a bend in the stem adjacent the head, the stem illustrated herein is shown as being preformed with respect to this bend. However, it should be understood that the tool is capable of being used to bend entirely straight stems and that such use is within the contemplation of the present invention. The valve stem herein shown includes the head 45 adjacent which is the preformed bend 46 while outwardly of the bend is the relatively elongated tubular portion 47 which must be bent to a certain angle and at a certain point intermediate the bend 46 and the outer end of the portion 47.

When it is desired to adapt a valve stem such as shown in full lines in Figure 1 for use upon a certain type of wheel the bend must be of a certain angle and at a certain location with respect to either the preformed bend 46 or the outer end of the portion 47 of the valve stem. The valve stem is arranged in the tool in the manner shown in Fig. 1. This is accomplished by arranging the preformed bent portion 46 of the stem in the recesses 31 in the plate 28 with the straight portion 47 of the stem extending along the plate 12 and adjacent to the flange 14 thereof when the arms 10 and 11 are arranged at substantially right angles to each other and between the pin 22a and the portion 24. The location of the bend to be formed in the portion 47 of the stem may be determined either with respect to the preformed bend 46 or with respect to the end of the portion 47 of the stem. In the former case the set screw 26 is loosened to allow the plate 28 to be moved until the pointer 29 coincides with the graduation on the scale 30 on the plate that indicates the desired distance of the bend from the preformed bend 46.

If the location of the bend is to be determined with respect to the outer end of the portion 47 of the valve stem, as must be the case with an entirely straight stem the set screw 17 is loosened and the rod 16 moved into engagement with the end of the stem until the pointer 20 carried by the angle member 18 coincides with the proper graduation on the scale 21 on the arm 10, it being appreciated that during this operation the set screw 26 is in loosened position so that the valve stem and the plate 28 will be free to move under the influence of the end of the rod 16 if a valve stem having a preformed bend is being acted upon. These two adjustments naturally are interrelated since the distance of the bend from the end of the stem is dependent upon the distance thereof from the preformed bend 46 and consequently these adjustments serve as a check upon each other and render the tool more accurate in operation. Furthermore, the rod 16 engaging the end of the valve stem serves as an abutment to hold the stem against the left hand side of the slot 31.

The angularity of the bend being determined the nut 41 is loosened to allow the plate 34 to be adjusted in the proper position or until the points 40 of the washer coincide with the recesses or grooves 43 bearing the number corresponding to the degree angle desired, whereupon the nut 41 is tightened and the plate 34 clamped in such position.

The operator grasping the arms 10 and 11 swings the same together until the end of the plate 34 engages with the arm 10 and stops further movement of the arms. During this movement of the arms toward each other the flange 14 of the plate 12 being in engagement with the end of the valve stem causes the valve stem to be bent around the head 22a of the bolt or pin 22 as a fulcrum or to the dotted line position shown in Fig. 1.

When the tool is used to bend an entirely straight valve stem, that is a stem without the preformed bend, the plate 28 is moved to the right (as viewed in the drawing) so as not to interfere with the valve stem head or it may be removed entirely. The valve stem is positioned in the tool with the head lying to the left of the arm 11 and the tubular stem extending between the pin 22a and the portion 24 is supported by the plate and lies against the flange 14 and the portion 24.

Although a preferred embodiment of the invention has been illustrated and described herein it should be appreciated that the same is susceptible of various changes and modifications within the scope of the appended claims.

Having thus described my invention I claim:

1. A tool of the character described, comprising a pair of arms each having laterally extending means adapted to engage one side of the article to be bent, a pin pivotally connecting said arms and having an extension adapted to engage said article on the side thereof opposite to said first mentioned side and forming a fulcrum for the bending operation, an adjustable member carried by the laterally extending means on one of said arms and adapted to engage the article adjacent an end thereof, and means for limiting the pivotal movement of said arms in one direction.

2. A tool of the character described, comprising a pair of arms having laterally extending means adapted to engage one side of the article to be bent, a pin pivotally connecting said arms and having an extension adapted to engage said article on the side thereof opposite to said first mentioned side and forming a fulcrum for the bending operation, adjustable members on both of said arms, one of said members being adapted to be engaged with one end of said article and the other of said members being adapted to be engaged with said article adjacent its other end, and means for limiting the pivotal movement of said arms in one direction.

3. A tool of the character described, comprising an arm having a laterally extending portion at its outer end, a second arm having a laterally extending portion along one of its longitudinal edges, said laterally extending portions of said arms being adapted to engage one side of the article to be bent, a pin pivotally connecting said arms and having an extension adapted to engage said article on the side thereof opposite to said first mentioned side and forming a fulcrum for the bending operation, a member adapted to engage with said article adjacent an end thereof, means associated with said laterally extending portion of the first mentioned arm for adjustably supporting said member, and means for limiting the pivotal movement of said arms in one direction.

4. A tool of the character described, comprising an arm having a laterally extending portion at one end thereof, a second arm having a laterally extending portion along one of its longitudinal edges, said laterally extending portions of said arms being adapted to engage one side of the article to be bent, a pin pivotally connecting said arms and having an extension adapted to engage said article on the side thereof opposite to said first mentioned side and forming a fulcrum for the bending operation, a member adapted to be engaged with said article adjacent an end thereof, means associated with said laterally extending portion of said first named arm for adjustably supporting said member, an adjustable member on said second named arm and adapted to be engaged with the opposite end of the article, and means for limiting the pivotal movement of said arms in one direction.

5. A tool of the character described, comprising an arm having a laterally extending portion at one end thereof, a second arm having a laterally extending portion adjacent one of its longitudinal edges, said laterally extending portions of said arms being adapted to engage one side of the article to be bent, a pin pivotally connecting said arms and having an extension adapted to engage said article on the side thereof opposite to said first mentioned side and forming a fulcrum for the bending operation, a member adapted to be engaged with said article adjacent an end thereof, means associated with said laterally extending portion of said first mentioned arm and adjustably supporting said member, an adjustable member on said second mentioned arm and adapted to be engaged with the opposite end of said article, and adjustable means carried by one of said arms and engageable with the other of said arms for limiting the pivotal movement of said arms in one direction.

In testimony whereof, I hereunto affix my signature.

JOHN C. CROWLEY.